United States Patent [19]
Burrage

[11] Patent Number: 5,483,683
[45] Date of Patent: Jan. 9, 1996

[54] CHANGEOVER MEANS FOR R.F. SOURCE

[75] Inventor: Clement P. Burrage, Essex, United Kingdom

[73] Assignee: GEC-Marconi Limited, Middlesex, United Kingdom

[21] Appl. No.: 220,009

[22] Filed: Mar. 30, 1994

[30] Foreign Application Priority Data

Mar. 31, 1993 [GB] United Kingdom .................... 9306709

[51] Int. Cl.⁶ ..................................................... H04B 1/04
[52] U.S. Cl. ........................................... 495/127; 455/115
[58] Field of Search .................................... 455/103, 105, 455/115, 120, 127, 121, 125; 333/100, 126, 124, 129, 132; 371/8.1, 8.2

[56] References Cited

U.S. PATENT DOCUMENTS

| | | |
|---|---|---|
| 2,534,624 | 12/1950 | Posthumus . |
| 4,602,227 | 7/1986 | Clark et al. ............................... 455/103 |
| 4,851,796 | 7/1989 | Hendriks ................................. 333/129 |

FOREIGN PATENT DOCUMENTS

| | | |
|---|---|---|
| 1079069 | 3/1958 | France . |
| 1039823 | 8/1966 | United Kingdom . |
| 1094867 | 12/1967 | United Kingdom . |
| 1330016 | 9/1973 | United Kingdom . |

Primary Examiner—Reinhard J. Eisenzopf
Assistant Examiner—Marsha D. Banks-Harold
Attorney, Agent, or Firm—Lowe, Price, LeBlanc & Becker

[57] ABSTRACT

A changeover device provides for contactless interchange of power between an r.f. source such as a transmitter $Tx_1$ and two loads, such as an aerial 2 and a test load 3. The device may be used in a changeover system for exchanging main and standby transmitters in the event of failure of the main transmitter between the aerial and a test load, or for connecting transmitters in parallel in such a way as to leave them well matched in the event of failure of one while permitting half power operation from the surviving transmitter.

15 Claims, 3 Drawing Sheets

CHANGEOVER MEANS FOR R.F. SOURCE

This invention relates to a changeover means for an r.f. source, particularly but not exclusively for use with an r.f. transmitter.

TECHNICAL FIELD

It is normal practice for radio and television transmitting stations to provide a standby transmitter as well as a main transmitter for each frequency on which transmission takes place. In the event of the main transmitter failing, it is switched off, disconnected from the aerial, and the standby transmitter is then connected to the aerial and then switched on. The main transmitter would then normally be connected to a test load and powered on to enable the fault to be located. It would be desirable to be able to exchange the main transmitter and the standby transmitter between the aerial and a test load in the event of a problem developing on the main transmitter, to ensure no loss of transmission, but the high powers of transmitters would cause arcing at switch contacts, and so in practice both transmitters are switched off at the changeover, necessitating an interruption of transmission. Also, transmitters could be damaged if working into mismatched loads and, for this reason, normally have built-in protection circuits to switch themselves off. It is also known to connect two transmitters in parallel to an aerial, so that transmission is maintained if one transmitter fails. However, the output drops to one quarter power in such a case, and the functioning transmitter has to be disconnected and reconnected on its own to the aerial to enable its power output to be fully utilized, again resulting in a loss of transmission.

The Applicants have invented a changeover means which can be used to avoid this disadvantage, while also having more general use. The changeover means is based on the coupling between resonant circuits.

Referring to FIG. 1, in a circuit with an LC parallel resonant circuit connected in parallel with an input and another connected in parallel with an output, there would normally be no coupling between the input and the output, so that an AC source connected to the input would not be coupled to the output. However, there are two ways of achieving coupling between two such resonant circuits, namely, inductively and capacitively. Inductive coupling could be accomplished by mutual inductance of the inductors by arranging them in sufficiently close proximity, or by the use of a common inductor (FIG. 2) and capacitive coupling can be accomplished by a capacitor connected between the circuits (FIG. 3). In the case of inductive coupling, a proportion of the AC input is present at the output, but the output leads the input by 90°. In the case of the capacitive coupling of FIG. 3, a proportion of the AC input again appears at the output, but the output now lags the input by 90°.

DISCLOSURE OF THE INVENTION

The invention provides a changeover means for an r.f. source, comprising a first resonant circuit for connection to the r.f. source, second and third resonant circuits for connection, respectively, to two loads, the circuits being resonant at the frequency of the source, there being inductive and capacitive coupling between the first resonant circuit and each of the second and third resonant circuits, and means for varying the amount of capacitive coupling relative to the amount of inductive coupling between the first resonant circuit and each of the second and third resonant circuits in such a way as to permit interchange of power between the loads while maintaining constant the impedance into which the r.f. source operates.

The arrangement permits continuously variable splitting of power between the two loads.

Advantageously, the coupling between the first and second resonant circuits is variable between a maximum value at which the insertion loss of the changeover means is substantially zero and a substantially zero value at which the inductive and capacitive couplings produce equal amplitude but anti-phase voltages across the respective load. The coupling between the first and third resonant circuits may be similarly variable to produce maximum coupling and cancellation corresponding to cancellation and maximum coupling, respectively, between the first and second resonant circuits. With such a coupling, a transmitter can be switched in a contactless fashion between, for example, an aerial and a test load. Changeover of two transmitters, a main and a standby, between two loads, an aerial and a test load, can be accomplished by employing two such changeover means, one for each transmitter, with common aerial and test load. Transfer of main transmitter power from the aerial to the test load is accompanied by transfer of standby transmitter power in the opposite direction. In this way, the switching is contactless and no programme interruption takes place.

The coupling between the first resonant circuit and the second (or the third) resonant circuit may be variable to a value at which the source is matched to an impedance twice that of the load impedance. This then permits two transmitters to be combined in parallel with common aerial and test load (bringing the load impedances down to their original values since identical impedances in parallel are halved in value). Both can power the aerial, and the test load can be disconnected by connecting the two transmitters to it in anti-phase. If one transmitter fails, the other continues broadcasting, but at one quarter power. Now, however, the relevant coupling circuits can be varied in step with each other to match the transmitter to the aerial which it alone now supplies, and to cancel its output at the test load. Transmission at half power is now achieved.

While the above has referred to radio or television transmitters, which are usually of relatively high power, the invention is applicable more generally to any r.f. source at any power level. At higher powers, the variation of coupling may be conveniently obtained by variable capacitors: at low powers varactors may be used to vary the coupling.

The invention is also applicable to means for selective connection of an r.f. source to a single load, namely, comprising a first resonant circuit for connection to the r.f. source, a second resonant circuit for connection to a load, the circuits being resonant at the frequency of the source, there being inductive and capacitive coupling between the first and second resonant circuit, and means for varying the amount of inductive coupling relative to the amount of capacitive coupling between a maximum value at which the insertion loss of the changeover means is substantially zero and a substantially zero value at which the inductive and capacitive couplings produce equal amplitude but anti-phase voltages across the load. This provides a contactless switch.

DESCRIPTION OF THE DRAWING

Changeover means constructed in accordance with the invention, will now be described, by way of example, with reference to the accompanying drawings, in which.

BEST MODE FOR CARRYING OUT THE INVENTION

Figure 4:
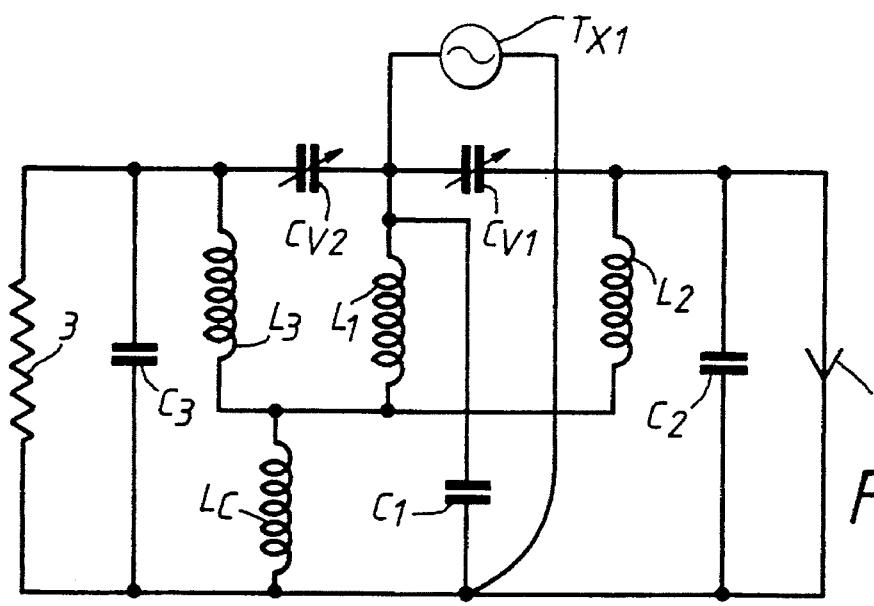
FIG. 4 is a changeover means for interchange of power from an r.f. transmitter between an aerial and a test load.

Referring to FIG. 4, the changeover means consists of a first resonant circuit connected in parallel with the input of the changeover means, to which an r.f. transmitter $Tx_1$ is connected, and two resonant circuits connected in parallel with the output of the changeover means, to which an aerial 2 and a test load 3 are, respectively, connected, the first resonant circuit being coupled with a variable degree of coupling to the second and third resonant circuits.

The first resonant circuit consists of capacitor $C_1$ in parallel with a series connection of an inductor $L_1$ and common inductor $L_C$ (common to all three resonant circuits). The second and third resonant circuits consist respectively, of capacitor $C_2$ in parallel with a series connection of inductor $L_2$ and common inductor $L_C$, and of capacitor $C_3$ in parallel with a series connection of inductor $L_3$ and common inductor $L_C$. There are series variable capacitors $C_{V1}$, $C_{V2}$ connecting the resonant circuits.

The resonant frequency of each resonant circuit is chosen to be the same as the center frequency of the transmitter. Clearly, the resonant frequency will vary as $C_{V1}$, $C_{V2}$ vary, and the parallel capacitors $C_1$, $C_2$, $C_3$ could be slightly adjusted to compensate, but in reality it would be sufficient if $C_1$, $C_2$, $C_3$ are set to an average position.

Figure 5:
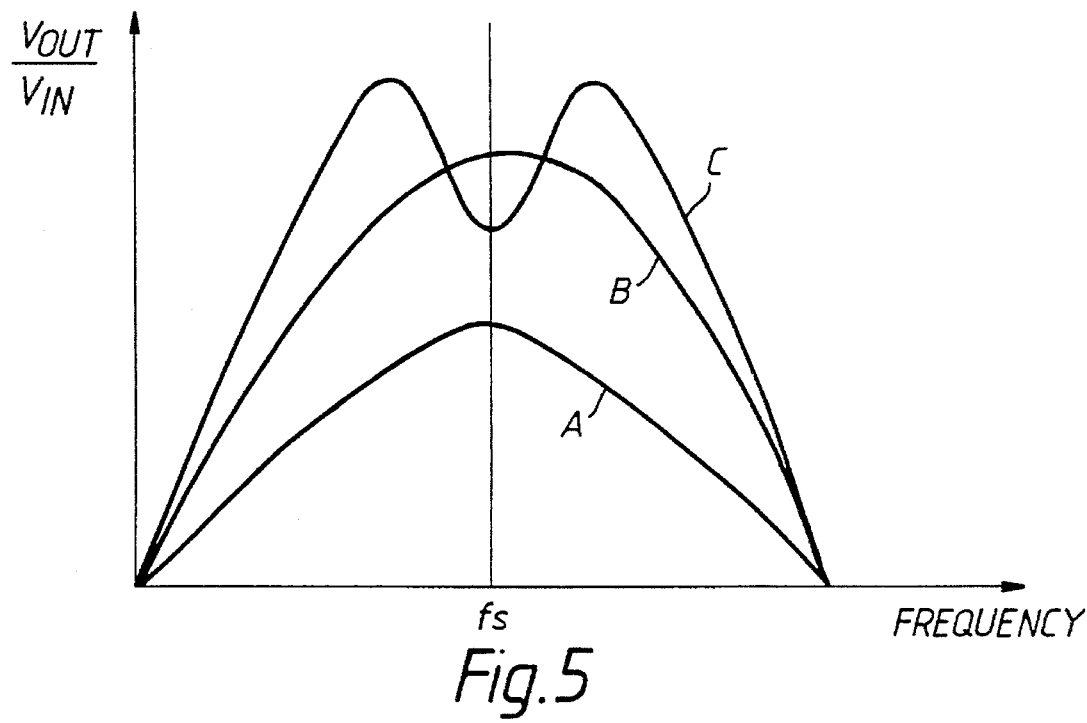
FIG. 5 shows the amplitude response at the aerial and the test load for various degrees of coupling.

The capacitors $C_{V1}$, $C_{V2}$ are each variable between two extreme values. In one extreme value of $C_{V1}$, its capacitance is zero and the circuit in the right hand half of FIG. 4 behaves like that of FIG. 2. The size of $L_C$ relative to $L_1$, $L_2$ is chosen so that there is critical coupling between the two resonant circuits. This corresponds to curve B in FIG. 5, representing the voltage fed to the aerial 2, which peaks at the resonant frequency (fs), and is also equal to the voltage appearing at the input, i.e. the input is perfectly matched to the load, and there is no insertion loss caused by the changeover means in these circumstances. Also, the r.f. transmitter $Tx_1$ sees a purely resistive load presented by the aerial. Too low a value of $L_C$ results in undercoupling, shown by curve A, and too high a value results in overcoupling, shown by curve C. The output voltage leads the input voltage by 90°. In this setting, the aerial is powered in exactly the same way as it would be if connected directly to the transmitter.

Figure 3:
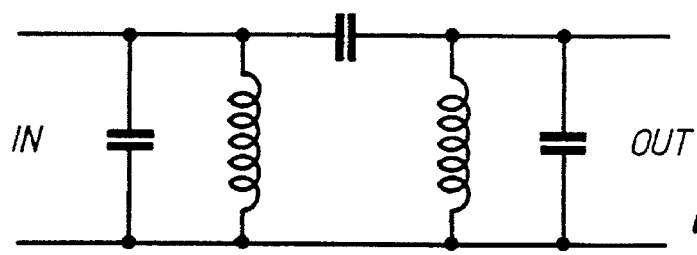
FIG. 3 shows a modification of the circuit of FIG. 1 to include capacitive coupling.

In the other extreme value of $C_{V1}$, the capacitor $C_{V1}$ is set at such a value as itself to produce critical coupling between the resonant circuits (using the principle shown in FIG. 3).

The shape of the amplitude response is exactly the same, but this time the output lags the input by 90°. Of course, the critical inductive coupling is still present, and the result of the combined coupling effects is that equal but anti-phase voltages are generated in the aerial 2, resulting in the transmitter and aerial now behaving as if disconnected from each other.

The left hand half of the circuit of FIG. 4 operates in an identical but inverse way to the right hand half. Thus, $C_{V2}$ is variable between zero capacitance, corresponding to critical inductive coupling, and the value corresponding to critical capacitive coupling and hence cancellation. But $C_{V1}$ and $C_{V2}$ are coupled so that cancellation at the test load 3 corresponds to critical inductive coupling at the aerial 2, and cancellation at the aerial 2 corresponds to critical inductive coupling at the test load 3.

In both extreme cases, the input impedance of the changeover means is that of the aerial or the test load (which are of course the same), the parallel impedance of the load at which cancellation occurs of course being infinite. But the coupling of $C_{V1}$, $C_{V2}$ is such that the input impedance remains at this value throughout the changeover, so that the r.f. transmitter will operate into a constant matched impedance throughout.

The changeover means of FIG. 4 is thus a contactless switch for powering and powering down the transmitter.

This has one minor practical problem in that it is difficult to make variable capacitors with zero minimum capacity. This effect is easily overcome by making the inductive coupling slightly too much, and using the residual capacitive coupling of $C_{V1}$, $C_{V2}$ to reduce it to the optimum. The higher capacity settings are also increased by this residual amount, i.e. there is cancellation of slightly overcoupled inductive and capacitive couplings (curves slightly of the form C in FIG. 5).

It will be realized that increase of $C_{V1}$ or $C_{V2}$ beyond the critical capacitive coupling will result in overcoupling of capacitive coupling sufficient to cancel the inductive coupling and to result in critical capacitive coupling i.e. the extreme residual capacitive setting could be replaced by a much higher setting in which critical inductive coupling is replaced by critical capacitive coupling.

It will also be realized that the capacitors $C_{V1}$, $C_{V2}$ need not be varied as far as the extreme settings of critical coupling or cancellation, but could be variable over a more restricted range. Such a changeover means would not switch the transmitter power wholly to the aerial or wholly to the test load. But such a changeover means could be useful as a continuously variable ratio splitter. For example, two aerials could be fed from a transmitter, and the ratio of power fed to each could be varied in order to vary the direction in which the signal was broadcast.

Figure 6:
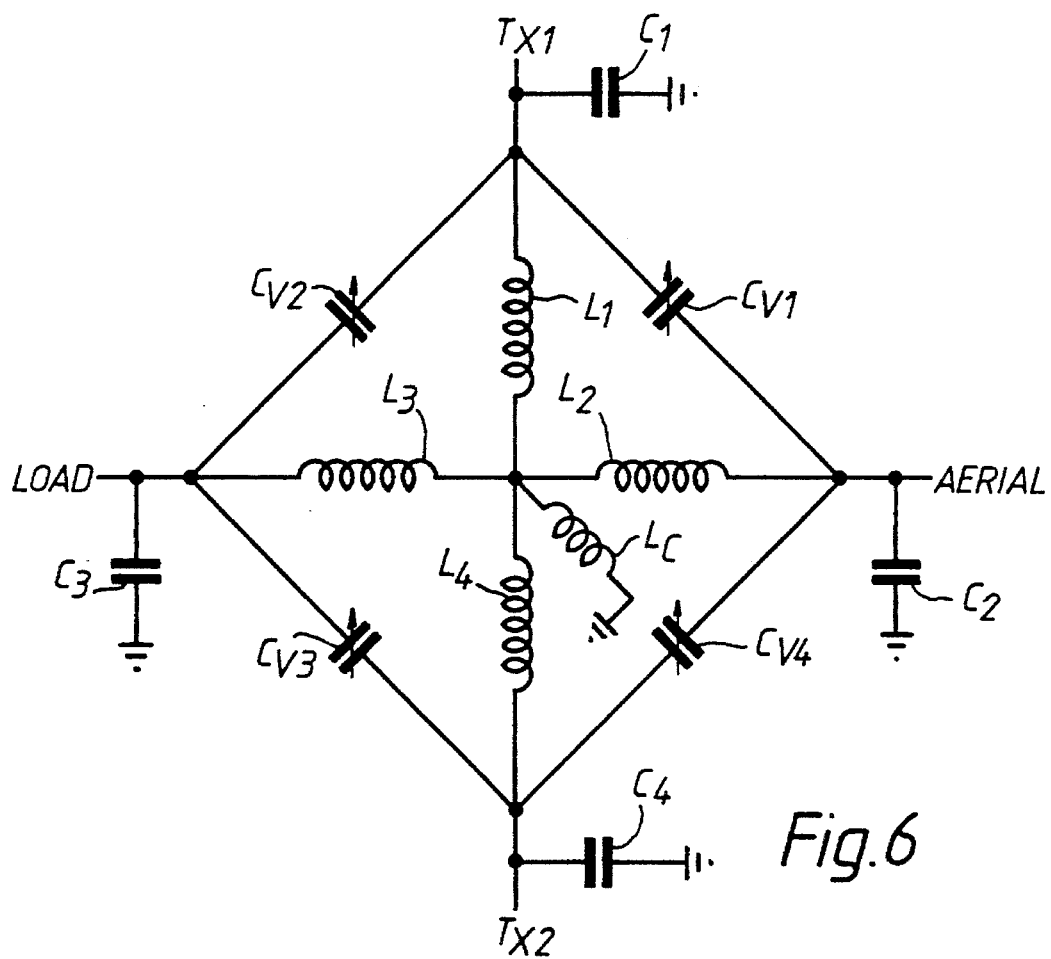
FIG. 6 is a changeover system for exchanging the two loads to which two transmitters are connected and, with different capacitance values, for use with two transmitters connected in parallel.

In the changeover system shown in FIG. 6, there are two changeover means of the kind shown in FIG. 4, for connecting two transmitters $T_{x1}$, $Tx_2$ to common loads 2, 3. The resonant circuits in parallel with those loads are also common $C_2$, $L_2+L_C$ and $C_3$, $L_3+L_C$, but there is an additional resonant circuit $C_4$, $L_4+L_C$ in parallel with transmitter $Tx_2$. Two additional variable capacitors $C_{V3}$, $C_{V4}$ provide variable capacitive coupling between the resonant circuit across transmitter $Tx_2$ and those across the test load and the aerial respectively.

In a first mode of operation, the changeover system is designed to exchange transmitters $Tx_1$ and $Tx_2$ between the aerial 2 and the test load 3. Transmitters $Tx_1$ and $Tx_2$ are in phase with each other. The variable capacitors $C_{V1}$–$C_{V4}$ are connected so that while the power of transmitter $Tx_1$ is being transferred progressively from aerial 2 to test load 3, the power of transmitter $Tx_2$ is being transferred progressively from test load 3 to aerial 2. Thus, one transmitter is a main transmitter and the other is a standby transmitter. In the event of failure of the main transmitter $Tx_1$, the capacitors $C_{V1}$–$C_{V4}$ are varied so as to progressively transfer the power of $Tx_1$ to the test load 3, to permit maintenance, while simultaneously transferring the power of $Tx_2$ from the test load to the aerial. The changeover is contactless and, provided the fault in the main transmitter is noticed before it finally fails, is transparent as far as the program being broadcast is concerned. Further, each transmitter sees a constant impedance at all times equal to that of the aerial and the test load (since the total power in either aerial or test load remains at the value generated by either transmitter even during the changeover when, for example, at the half way point half the power of each transmitter is dissipated in both the aerial and the test load).

The operation is summarized in the following table.

| $Tx_1$ to | $Tx_2$ to | $C_{V1}$ | $C_{V2}$ | $C_{V3}$ | $C_{V4}$ |
| --- | --- | --- | --- | --- | --- |
| Aerial | Load | Min | Max | Min | Max |
| Load | Aerial | Max | Min | Max | Min |

In a second mode of operation, with different component values, the changeover system of FIG. 6 may be used to enable two transmitters $Tx_1$ and $Tx_2$ to be operated in parallel, with the ability to remain well matched in the event of failure of one transmitter (albeit operating at one quarter power), and with the facility for the functioning transmitter to be switched in a contactless fashion wholly to the aerial to restore operation to half power. Again, the transmitters must operate in phase.

Now that both transmitters $Tx_1$ and $Tx_2$ are operating simultaneously, they must each be matched into twice the impedance of the aerial and twice the impedance of the test load, even though the impedance of the latter is not changed. This is because the aerial (say) now has twice the power dissipated by it, implying a voltage swing and a current swing each increased by the square root of 2 from the voltage and current swing due to one transmitter alone. Each transmitter supplies half that current, which means the current swing is decreased by root 2 from when supplying the aerial on its own. Thus for both transmitters to operate simultaneously, each must provide a voltage swing increased by root 2 and a current swing reduced by root 2, which means that the transmitters must be matched into twice the aerial impedance.

Figure 1:
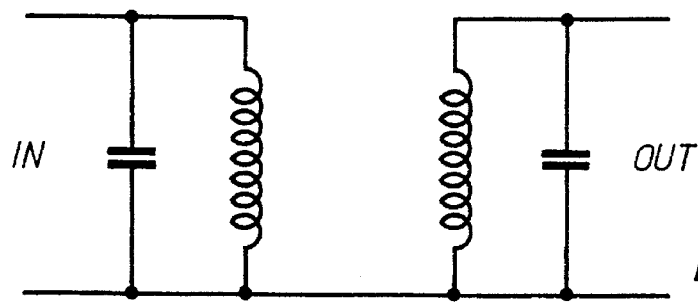
FIG. 1 shows a known circuit without coupling between input and output.
Figure 2:
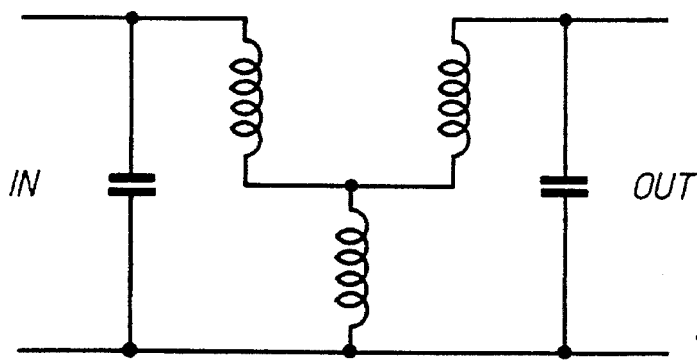
FIG. 2 shows a modification of the circuit of FIG. 1 to include inductive coupling.

This is achieved by selection of suitable values of variable capacitors $C_{V1}$, $C_{V4}$. Referring to FIGS. 2 and 3, if the coupling is too small, the insertion loss will increase and the input match will deteriorate, but by increasing the output impedance, both loss and match will return to perfect. In other words, by correct choice of coupling the input can be matched to any required output impedance. Note that the circuit is symmetrical and thus the effect is reciprocal i.e. an input impedance of R can be matched to an output of 2R, or an input of 2R can be matched to an output of R. In fact, the capacitance values are chosen so that there is a 2:1 impedance transformation across the variable capacitors $C_{V1}$, $C_{V4}$. Thus $Tx_1$, $Tx_2$ are correctly matched with the aerial.

In the event of failure of one transmitter, the resulting bad mismatch (a 2:1 vswr) of the other transmitter would trip the surviving transmitter off, and this is avoided by connecting a load in such a manner that in normal operation it is drawing no power but under fault conditions it is connected in such a way as to maintain a well-matched output for the surviving transmitter. The test load 3 is used as this balancing load.

As mentioned above in the circuit of FIG. 4, as the variable capacitor is varied from minimum to an optimum value the coupling varies from inductive to minimum. If the capacitor value is further increased the coupling will return but now be capacitive and a point found where the insertion loss is again zero with a perfect match. But now the output is in anti-phase to that obtained before. This same argument applies even if the circuit is coupling between different source and load impedances, the capacitor is just set to different values.

This effect is used when connecting the transmitter outputs to the test load. One is connected with low capacity in one phase and the other connected with very high capacity in the opposite phase. Thus, with the transmitters co-phased, the two test load inputs are in anti-phase and cancel out so that no power is actually developed in the load.

In order to maintain the match of the surviving transmitter in the event of one transmitter failing, capacitors $C_{V2}$, $C_{V3}$ are also (like $C_{V1}$, $C_{V4}$) set to produce a 2:1 impedance transformation. Thus, when one transmitter fails, power is now dissipated in the test load 3 by the surviving transmitter, and this is now matched with twice the aerial impedance in parallel with twice the test load impedance i.e. the surviving transmitter is correctly matched to the impedance of the aerial.

However, by further alteration of capacitance values, it is now possible to couple the surviving transmitter exclusively to the aerial. For example, if transmitter $Tx_2$ fails, capacitor $C_{V1}$ is altered so that there is no longer an impedance transformation, but zero insertion loss so that transmitter $Tx_1$ dissipates all its power in aerial 2. Capacitor $C_{V2}$ is altered so that there is no longer an impedance transformation, but cancellation of inductive and capacitive coupling of the test load 3.

The coupling capacitors are used in four capacitance positions, i.e.

1. 'Low' capacity (inductive coupling) to couple to high impedance (2 to 1 ratio),
2. 'Medium' capacity (partially cancelled inductive coupling) to couple between same impedances,
3. 'High' capacity (fully cancelled inductive coupling) to disconnect source and load,
4. 'Higher' capacity (capacitive coupling) to couple to high impedance as in position 1, but in opposite phase.

So, referring to FIG. 5, we have the following arrangements.

| | $Tx_1$ to | $Tx_2$ to | $C_{V1}$ | $C_{V2}$ | $C_{V3}$ | $C_{V4}$ |
| --- | --- | --- | --- | --- | --- | --- |
| (a) | Aerial | Aerial | Low | Low | Higher | Low |
| (b) | Aerial | Load | Med | High | Med | High |
| (c) | Load | Aerial | High | Med | High | Med |
| (d) | Load | Load | High | Low | Low | High |

In the first arrangement (a), $C_{V1}$, $C_{V4}$ couple both transmitters to a 2Zo output impedance. These two outputs in parallel match the Zo of the aerial. $C_{V2}$ and $C_{V3}$ couple both transmitters to twice the Zo of the load. But with one signal in anti-phase to the other (due to the different values of $C_{V2}$ and $C_{V3}$) both signals cancel and no power is dissipated in the load.

When $Tx_1$ transmitter fails $C_{V4}$ transforms the aerial Zo to 2Zo, and $C_{V3}$ transforms the load Zo to 2Zo. These two 2Zo's in parallel at the transmitter output present it with a correct match of Zo. Half the transmitter power goes to the load and half to the aerial. The total aerial power has now dropped to a quarter. The same applies to a $Tx_2$ failure but using $C_{V1}$ and $C_{V2}$.

Half power operation can be restored, and the failed transmitter connected to the load by moving the capacitor values to positions shown in (b) or (c) depending on which transmitter failed.

In the second arrangement (b), $C_{V2}$ disconnects $Tx_1$ from the load and $C_{V1}$ connects it to the aerial without impedance transformation. Likewise $C_{V4}$ disconnects $Tx_2$ from the aerial and $C_{V3}$ connects it to the test load without impedance transformation.

In the third arrangement (c), the same happens but using opposite capacitors for the opposite transmitter connections.

In the fourth arrangement (d), $C_{V2}$, $C_{V3}$ couple both transmitters to a 2Zo output impedance. These two outputs in parallel match the Zo of the test load. $C_{V1}$ and $C_{V4}$ disconnect the transmitters from the aerial.

Thus is achieved a standard parallel system, allowing both transmitters to be connected to the aerial, or one to fail leaving the other to continue working at quarter aerial power, or one to work to aerial at half aerial power and the other connected to the test load, or both to be connected to the test load.

Figure 7:
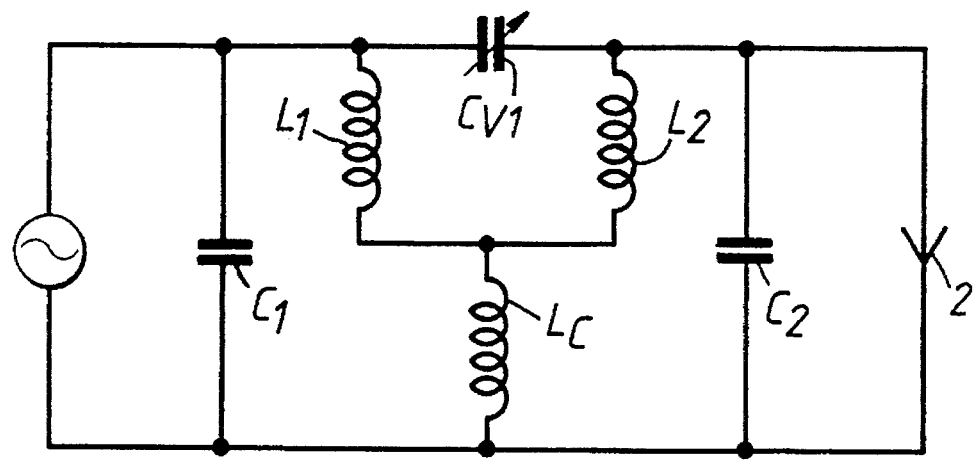
FIG. 7 is a changeover means for selective connection of an r.f. source to a single load.

With reference to FIG. 7, the invention is also applicable to this arrangement which is equivalent to one half of the circuit of FIG. 4, in which the transmitter $Tx_1$ can be switched on and off in a contactless fashion. In this case, the impedance seen by the transmitter would vary between the impedance of the aerial (which the transmitter is designed to operate into) corresponding to no insertion loss, and infinite corresponding to cancellation.

Figure 8:
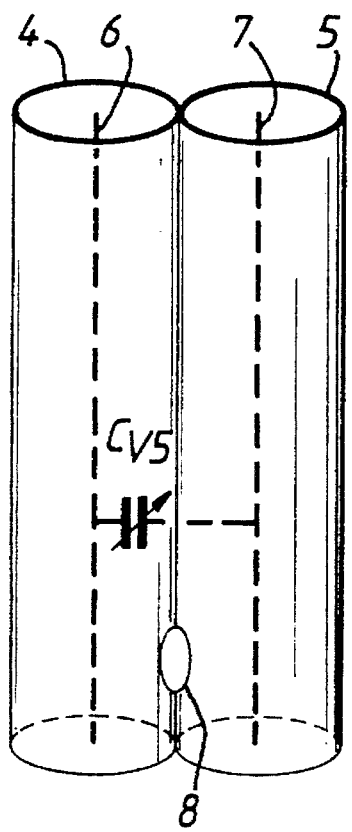
FIG. 8 shows an alternative form for two coupled resonant circuits in changeover means described.

Of course, variations may be made without departing from the scope of the invention. Thus, instead of coupling of the inductors by a common inductor, it would be possible in principle to couple by means of mutual inductance between the inductors e.g. by winding on a common core. Equally, while the variation of capacitive and inductive coupling has been described with reference to variation of the capacitive aspect of coupling, it would be in principle possible to vary the inductive part of the coupling, most probably by varying the values of $L_1$, $L_C$ etc, but it could be done in principle by varying the mutual inductance between inductors where there is no common inductor. Also, while the circuits described have parallel resonant circuits, the invention is applicable to series resonant circuits. The circuits described are best suited for use in the l.f. to h.f. frequency range, say up to about 30 MHz, and at power levels up to and beyond the megawatt range, but operation could be extended into the VHF region, for example by using coaxial resonators, and operation could be extended further into the UHF region and beyond, for example, by using cavity resonators. FIG. 8 illustrates a suitable form for the resonant circuit in the case of coaxial resonators. Two lengths of transmission line 4, 5, one quarter wavelength long, are coupled capacitively by means of a variable capacitance $C_{V5}$ between the central conductors 6, 7 and inductively by means of a common aperture 8 in the outer sheaths of the transmission lines.

I claim:

1. Changeover means for an r.f. source, comprising:
   a first resonant circuit having first and second terminals coupled respectively to first and second terminals of the r.f. source,
   a second resonant circuit having first and second terminals coupled respectively to first and second terminals of a first load,
   a third resonant circuit having first and second terminals coupled respectively to first and second terminals of a second load,
   said first, second and third resonant circuits being resonant at a center frequency of the source,
   means for establishing inductive coupling between said first resonant circuit and each of said second and third resonant circuits,
   means for establishing capacitive coupling between said first resonant circuit and each of said second and third resonant circuits, and
   means for varying an amount of capacitive coupling relative to an amount of inductive coupling between said first resonant circuit and each of said second and third resonant circuits,
   thereby causing interchange of power between the first and second loads while maintaining constant an impedance into which the r.f. source operates.

2. Changeover means as claimed in claim 1, in which the means for varying is operative to vary the coupling between said first resonant circuit and said second and third resonant circuits between a maximum value at which an insertion loss of the changeover means is substantially zero and a substantially zero value at which the inductive and capacitive couplings produce equal amplitude but anti-phase voltages across the terminals of the respective load.

3. Changeover means as claimed in claim 1, in which the coupling between the first resonant circuit and second resonant circuit is variable to a value at which the source is matched to an impedance twice that of the load impedance.

4. A changeover system for two transmitters operating in parallel connected via a changeover means as claimed in claim 3 each to both an aerial and a test load, respectively, wherein:
   in said first changeover means, said first resonant circuit has said first and second terminals thereof coupled respectively to first and second terminals of a first transmitter, said second resonant circuit has said first and second terminals thereof coupled respectively to first and second terminals of the aerial, and said third resonant circuit has said first and second terminals thereof coupled respectively to first and second terminals of a test load;
   in said second changeover means, said first resonant circuit has said first and second terminals thereof coupled respectively to first and second terminals of a second transmitter,
   the circuits being resonant at the center frequency of the first and second transmitters,
   further comprising means for establishing inductive coupling between said first resonant circuit of said second changeover means and each of said second and third resonant circuits of said first changeover means,
   means for establishing capacitive coupling between said first resonant circuit of said second changeover means and each of said second and third resonant circuits of said first changeover means,
   means for varying the amount of capacitive coupling relative to the amount of inductive coupling between said first resonant circuit of said second changeover means and each of said second and third resonant circuits of said first changeover means, thereby causing the coupling between said first resonant circuit of each of said first and second changeover means and said second resonant circuit of said first changeover means to be varied to a value at which each transmitter is matched to an impedance twice that of the aerial impedance, and causing the coupling between said first resonant circuit of each of said first and second changeover means and said third resonant circuit of said first changeover means to be varied such that the transmitters, which are co-phased in use, are in anti-phase in the test load.

5. A changeover system as claimed in claim 4, in which in the event of failure of one of the transmitters, said means for varying operates to vary the coupling so as to disconnect the surviving transmitter from the test load and to provide an impedance match between the surviving transmitter and the aerial.

6. A changeover system as recited in claim 4, wherein said second and third resonant circuits of said first changeover means and said second and third resonant circuits of said second changeover means respectively include common elements.

7. Changeover means as claimed in claim 1, in which the means for varying operates by means of variable capacitors.

8. A changeover system for a main and standby transmitter, the main and standby transmitters connected via respective first and second changeover means as claimed in claim 1 to an aerial and a test load, wherein:

in said first changeover means, said first resonant circuit has said first and second terminals thereof coupled respectively to first and second terminals of the main transmitter, said second resonant circuit has said first and second terminals thereof coupled respectively to first and second terminals of the aerial, and said third resonant circuit has said first and second terminals thereof coupled respectively to first and second terminals of a test load;

in said second changeover means, said first resonant circuit has said first and second terminals thereof coupled respectively to first and second terminals of the standby transmitter, the circuits being resonant at the center frequency of the main and standby transmitters, further comprising means for establishing inductive coupling between said first resonant circuit of said second changeover means and each of said second and third resonant circuits of said first changeover means, means for establishing capacitive coupling between said first resonant circuit of said second changeover means and each of said second and third resonant circuits of said first changeover means, means for varying the amount of capacitive coupling relative to the amount of inductive coupling between said first resonant circuit of said second changeover means and each of said second and third resonant circuits of said first changeover means, thereby causing the main transmitter to be gradually disconnected from the aerial and connected to the test load and the standby transmitter to be gradually connected to the aerial and disconnected from the test load in the event of failure of the main transmitter.

9. A changeover system as recited in claim 5, wherein said second and third resonant circuits of said first changeover means and said second and third resonant circuits of said second changeover means respectively include common elements.

10. A changeover means as recited in claim 1, wherein said varying means comprises a first variable capacitor connected between said first terminal of said first resonant circuit and said first terminal of said second resonant circuit, and a second variable capacitor connected between said first terminal of said first resonant circuit and said first terminal of said third resonant circuit.

11. A changeover means as recited in claim 1, wherein said resonant circuits comprise coaxial resonators having respective central conductors and outer sheaths, said coaxial resonators capacitively coupled by a variable capacitance connected between said respective central conductors thereof, said coaxial resonators inductively coupled by a common aperture in the respective outer sheaths thereof.

12. A changeover means as recited in claim 1, wherein said resonant circuits comprise cavity resonators.

13. Apparatus for selective connection of an r.f. source to a single load, comprising:

a first resonant circuit having first and second terminals coupled respectively to first and second terminals of the r.f. source, a second resonant circuit having first and second terminals coupled respectively to first and second terminals of a load, said first and second resonant circuits being resonant at the frequency of the source, means for establishing inductive coupling between said first and second resonant circuits, means for establishing capacitive coupling between said first and second resonant circuits, and means for varying an amount of inductive coupling relative to an amount of capacitive coupling between a maximum value at which an insertion loss of the apparatus is substantially zero and a substantially zero value at which the inductive and capacitive couplings produce equal amplitude but anti-phase voltages across the load.

14. A changeover system for a main and standby transmitter, each connected to an aerial and a test load, comprising:

a first resonant circuit having first and second terminals coupled respectively to first and second terminals of the main transmitter, a second resonant circuit having first and second terminals coupled respectively to first and second terminals of the aerial, a third resonant circuit having first and second terminals coupled respectively to first and second terminals of the test load, a fourth resonant circuit having first and second terminals coupled respectively to first and second terminals of the standby transmitter, said first, second, third and fourth resonant circuits being resonant at a center frequency of the transmitters, means for establishing inductive coupling between said first resonant circuit and each of said second and third resonant circuits and between said fourth resonant circuit and each of said second and third resonant circuits, means for establishing capacitive coupling between said first resonant circuit and each of said second and third resonant circuits and between said fourth resonant circuit and each of said second and third resonant circuits, and means for varying an amount of capacitive coupling relative to an amount of inductive coupling between said first resonant circuit and each of said second and third resonant circuits and between said fourth resonant circuit and each of said second and third resonant circuits, thereby causing the main transmitter to be gradually disconnected from the aerial and connected to the test load and the standby transmitter to be gradually connected to the aerial and disconnected from the test load in the event of failure of the main transmitter.

15. A changeover system for two transmitter operating in parallel each connected to both an aerial and a test load, comprising:

- a first resonant circuit having first and second terminals coupled respectively to first and second terminals of a first transmitter,
- a second resonant circuit having first and second terminals coupled respectively to first and second terminals of the aerial,
- a third resonant circuit having first and second terminals coupled respectively to first and second terminals of the test load,
- a fourth resonant circuit having first and second terminals coupled respectively to first and second terminals of a second transmitter,
- said circuits being resonant at a center frequency of the transmitter,
- means for establishing inductive coupling between said first resonant circuit and each of said second and third resonant circuits and between said fourth resonant circuit and each of said second and third resonant circuits,
- means for establishing capacitive coupling between said first resonant circuit and each of said second and third resonant circuits and between said fourth resonant circuit and each of said second and third resonant circuits,
- means for varying an amount of capacitive coupling relative to an amount of inductive coupling between said first resonant circuit and each of said second and third resonant circuits and between said fourth resonant circuit and each of said second and third resonant circuits, thereby causing the coupling between said first resonant circuit and said second resonant circuit and between said fourth resonant circuit and said second resonant circuit to be varied to a value at which each transmitter is matched to an impedance twice that of the aerial impedance, and the coupling between said first resonant circuit and said third resonant circuit and between said fourth resonant circuit and said third resonant circuit to be varied such that the transmitters, which are co-phased in use, are in anti-phase in the test load.

* * * * *